May 9, 1961 J. J. MAGUIRE 2,983,476
UNIVERSAL SLIDING MOUNT

Filed Feb. 11, 1959 3 Sheets-Sheet 1

INVENTOR
JOHN J. MAGUIRE
BY
ATTORNEY

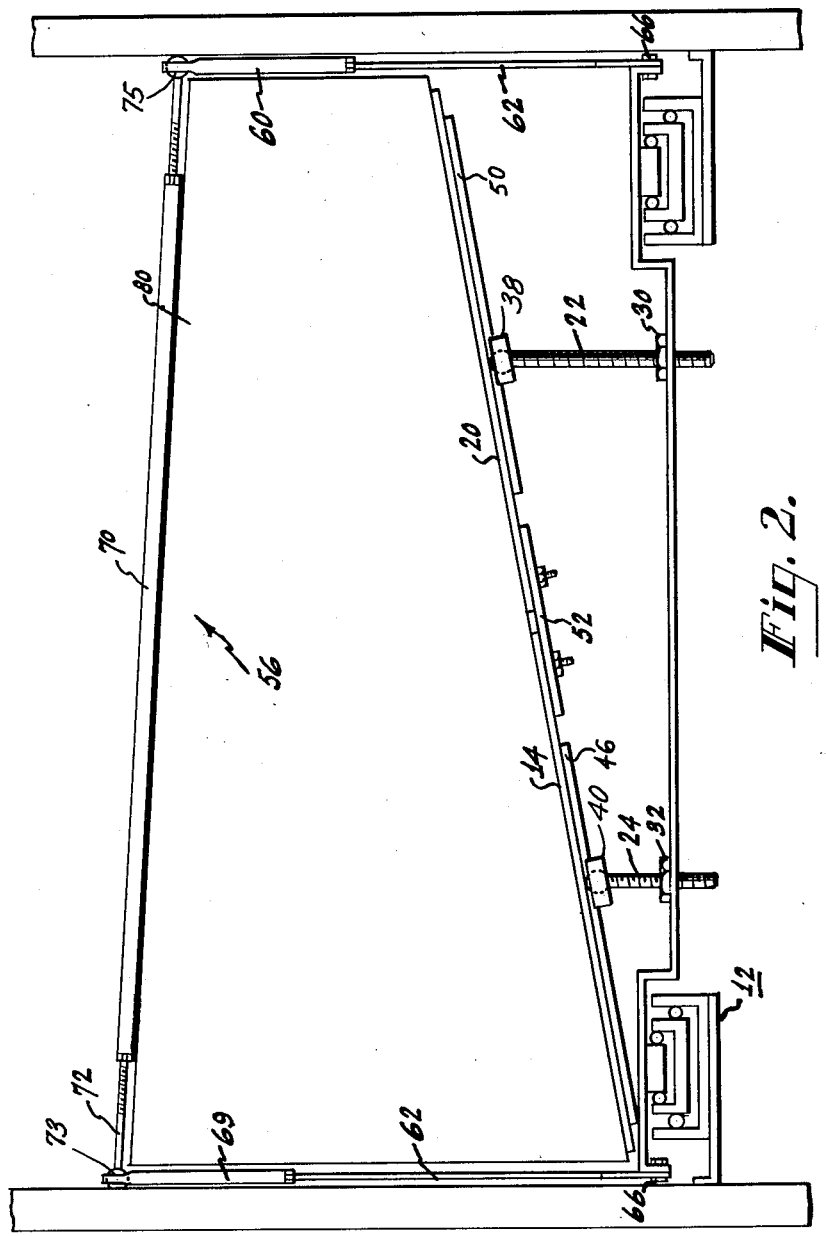

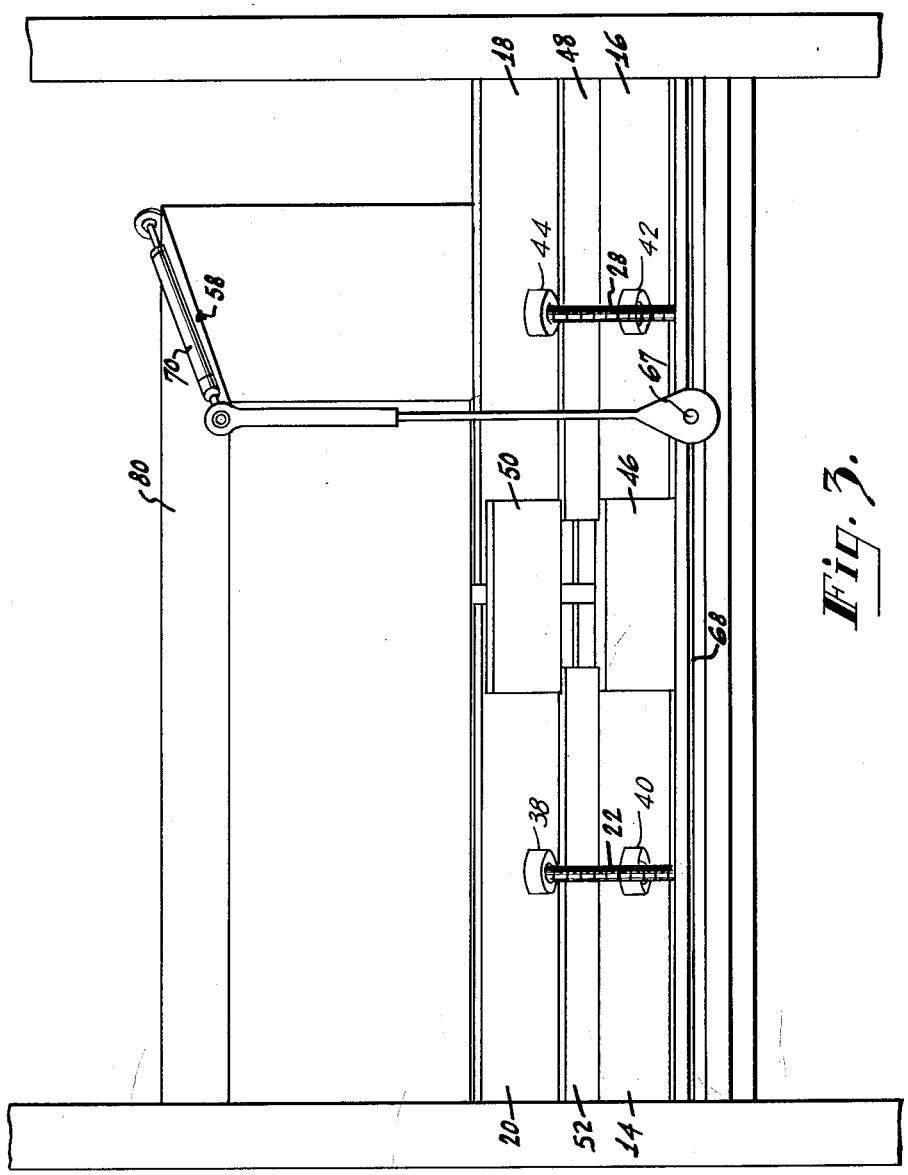

United States Patent Office 2,983,476
Patented May 9, 1961

2,983,476

UNIVERSAL SLIDING MOUNT

John J. Maguire, Philadelphia, Pa., assignor, by mesne assignments, to American Bosch Arma Corporation, Hempstead, N.Y., a corporation of New York Filed Feb. 11, 1959, Ser. No. 792,552

8 Claims. (Cl. 248—346)

This invention relates to a chassis mount, and more particularly to a variable chassis mount adapted to receive units or chassis of different dimensions and shapes.

In various types of rack mounted electronic equipment, it is often customary to have individual units included in individual chassis mounts with each unit including circuitry for performing a certain function within the system. Different systems might require racks having in the main, the same standard units with some of the particular units, for example, the power supply unit, being different. Very often, in these cases, it is necessary to employ units of different dimensions and shapes. For convenience, these units are often mounted on a sliding mount or bed which is adapted to be moved in and out of the rack on a slidable assembly. For example, the basic system involved in a complete rack may remain substantially the same with a requirement of a change in size of one of the units involved. In these cases involving units of different sizes, especially where a sliding assembly is involved, much design work and mechanical changes must be made in order to provide a strong bond between the units and the racks, while at the same time permitting convenient relative motion therebetween. Even a slight variation in the unit dimensions requires that a complete mechanical design and investigation be made.

It is an object of this invention to provide a mount adapted to receive units of different dimensions.

It is a further object of this invention to provide a universal chassis mount in which units of different sizes and shapes may be physically fixed to an adjustable base plate.

It is still a further object of this invention to provide a universal chassis mount for a slidable assembly in which units of different dimensions may be firmly secured within a rack.

In accordance with the present invention, a chassis mount includes a base plate having a plurality of segments adapted to receive chassis or units of different dimensions. Means are provided to adjust each of the segments independently of the others for different heights and angles. Adjustable means for securing a particular unit to the base plate are also provided.

Other objects and advantages of the present invention will be apparent and suggest themselves to those skilled in the art from a reading of the following specification and claims in conjunction with the accompanying drawings, in which:

Figure 2 is a front view of the universal chassis mount illustrated in Figure 1 together with a chassis mounted on a slide assembly; and Figure 3 is a side view of the universal chassis mount and chassis illustrated in Figure 2.

Figure 1:
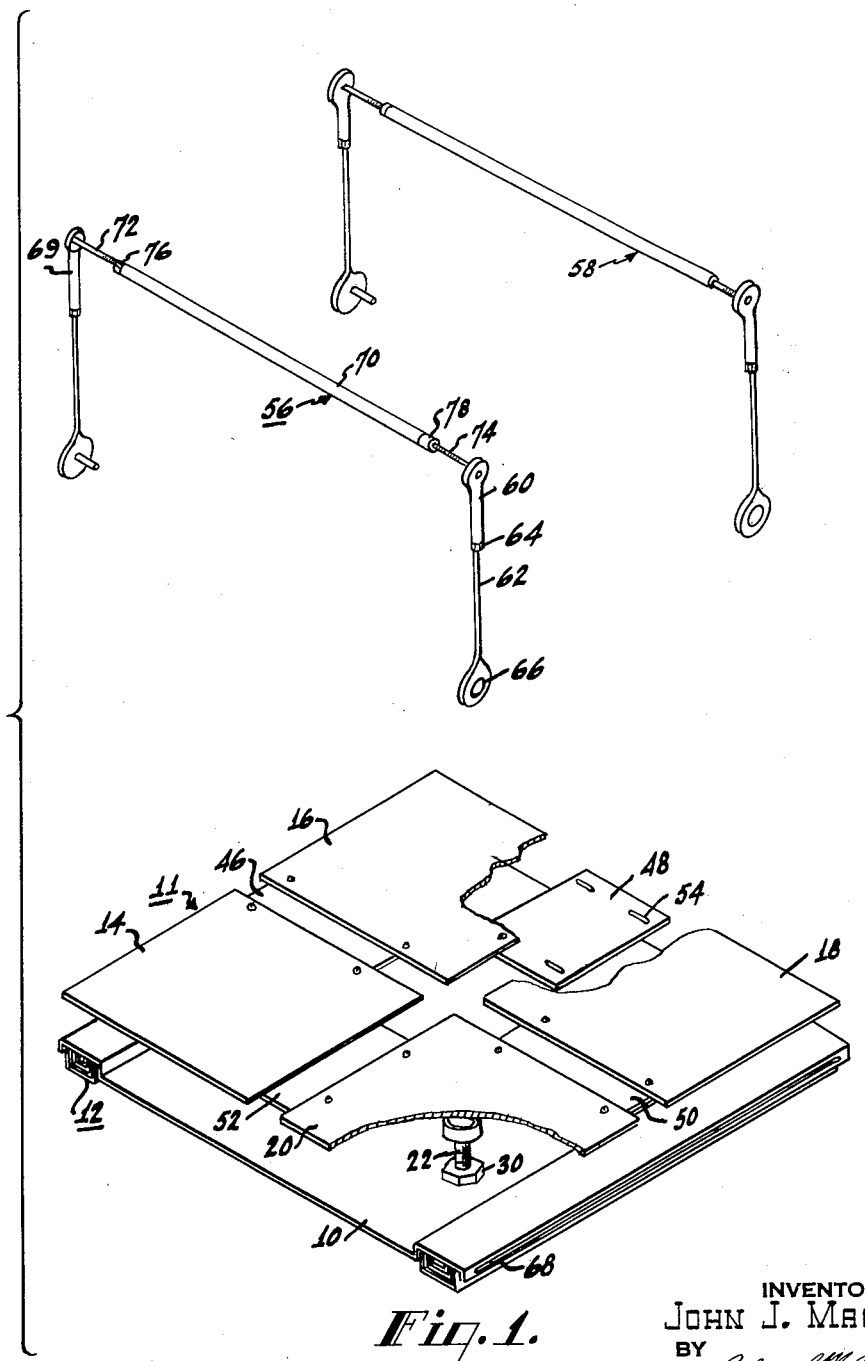
Figure 1 is an isometric view of a universal chassis mount, in accordance with the present invention.

Referring particularly to Figures 1, 2 and 3, a slidable bed or base member 10 is mounted on a sliding mechanism 12. The slidable base member 10 and sliding mechanism 12 may be adapted to fit into a rack mount (not shown) and adapted to be moved in and out said rack. Such mechanisms generally involving telescoping sliding support members adapted to be moved in and out of racks are well known to those skilled in the art and therefore are not described in detail.

A base plate 11 includes a plurality of segments 14, 16, 18 and 20. A plurality of similar type adjustable members of which only members 22, 24, and 28 are illustrated in the drawing (with only the adjustable member 22 being illustrated in Figure 1) are employed to independently adjust the positions of the segments of the base plate 11. The adjustable members 22, 24, and 28 comprise threaded members threadedly engaging slidable base member 10 and held fixedly in place thereto by means of similar type lock nuts of which only lock nuts 30 and 32 are illustrated in the drawing (Figure 2). Each of the adjustable members further include universal joints 38, 40, 42 and 44, upon which the segments of the base plate 11 rest. These universal joints may be of the type which include a ball member as illustrated by dotted lines in Figure 2 disposed to be moved within a socket, with the socket being movable in different angles.

The segments 14, 16, 18 and 20 are interconnected by means of connecting plates or members 46, 48, 50 and 52. Each of these connecting members include four elongated apertures or slots, such as illustrated by the aperture 54 associated with the member 48.

It may be seen that each of the adjustable members may be screwed into the base member 10 and locked into a position dependent upon the height and angle to which it is desired to adjust an associated segment of the base plate 11. The positions of the segments 14, 16, 18 and 20 are adapted to rest on these adjustable members. The universal joints make it possible to have each of the segments disposed at different heights and angles with respect to the base member 10. The slots within the connecting members 46, 48, 50 and 52 permit adjustment of the spacing between the individual segments. Thus it is seen that each of the segments may be adjusted to different heights thereby adapting the base plate 11 to provide a resting member for units involving bases which are not horizontal.

A pair of securing devices 56 and 58 are provided for fixedly securing a unit or chassis mounted or resting on the base plate 10, as will be seen more clearly in connection with Figures 2 and 3. Each of the securing devices 56 and 58 are identical, therefore only the elements of the device 56 will be described. The device 56 comprises a pair of similar link arrangements at both ends of a connecting rod 70. A tapped universal joint member 60 is adapted to receive a threaded connecting member 62 and locked in a desired fixed position by a lock nut 64. The bottom portion of the threaded connecting member 62 includes a pivot joint 66 having a pin 67 (Figure 3) which is adapted to be inserted into an elongated slot 68 of the slidable base plate 10. The universal joint member 60 is connected to the opposite joint 69 by the connecting rod 70. The connecting rod 70 is internally tapped to receive threaded members 72 and 74. A pair of lock nuts 76 and 78 are provided to lock the threaded members 72 and 74, respectively, to the connecting rod 70. The universal joints 60 and 69 may include a ball and socket arrangement to permit the connecting rod 70 to be adjusted to different angular positions with respect to the link arrangements. The ball and socket arrangement is illustrated by ball type members 73 and 75 disposed within apertures at the end of the universal joints 60 and 69.

It is seen that each of the segments 14, 16, 18 and 20 may be independently adjustable for different heights by different positions of the adjustable members of which the "members" 22, 24, and 28, are illustrated. When some of the segments are adjusted to different heights with respect to the others and all the segments are fixedly interconnected by the connecting plate members 46, 48, 50 and 52, the base plate 11 will be disposed at an angular position with respect to the base member 10.

In the arrangement illustrated, it is seen that various chassis or units placed upon the base plate 11 may be disposed at various different angles with respect to the base member 10. When such a unit, which may be an odd size or shape, is resting upon the base plate 10, the pins of the securing members 56 and 58 may be inserted into the slot 68 of the base member. By varying the link arrangements, as by screwing the link further into the threaded joint 60, and by properly positioning the pins, such as the pin 67 illustrated in Figure 3 within their associated slots, the securing members may be made to securely hold an associated chassis in fixed relationship to the base plate 11.

Referring particularly to Figures 2 and 3, one embodiment of the present invention is illustrated. A chassis or unit 80 is disposed to rest upon the base plate 11. The unit 80 is of an irregular size, being wider at its left side and gradually tapering to narrower dimensions towards the right side. Also, the back of chassis 80 (as seen in Figure 3) is disposed at an angle with respect to its front.

Despite this unusual size and shape of chassis 80, the use of the present invention makes it possible to have the chassis 80 rest securely on the base plate 11 and also provide means for holding the chassis 80 in a firm relationship with the base plate. As discussed in connection with Figure 1, each of the adjustable members 22, 24, 26 and 28 may be independently adjustable to provide a proper height and angle for its associated segments of the base plate 11.

Once the chassis 80 is in place, a front portion of the chassis may be secured in place by the securing member 56. It is seen in Figure 2 that the link arrangement at the left side of the connecting member 70 is adjusted to be longer than link arrangement at the right side in order to permit the connecting rod 70 to firmly engage the chassis 80, thereby holding it securely in place.

Likewise, the securing member 58 (Figure 3) which is similar to the securing member 56 (Figure 2) which holds the front portion of the chassis 80, is disposed at the rear of the chassis 80 to hold the chassis securely in place. The universal joints 60 and 69 make it possible to adjust the angular position of the connecting rod of the securing member 58 to coincide with the angular direction of the back of the chassis 80.

While a single embodiment has been illustrated, it is obvious that various modifications may be employed in practicing the present invention. For example, although four segments of a plate have been illustrated, the number will depend upon the particular application and may actually be more or less than the four illustrated. The particular type of adjustable members employed may vary with different applications. For example, some applications may not require the use of universal joints if angular positions of the securing members are not important.

While flat plates have been illustrated, it is conceivable that some applications may require curved or irregular base plates. Also, the use of connecting members for interconnecting the segments of the plates may in some cases be omitted.

What is claimed is:

1. In combination with a base member disposed upon a slidable assembly, a universal chassis mount comprising a base plate divided into a plurality of individual segments and adapted to have a chassis rest thereon, an adjustable member disposed between said base member and each of said individual segments of said base plate for varying the distance therebetween, and a securing member removably and adjustably attached to said base member to hold a chassis in fixed physical relationship with respect to said base plate, said securing member being adjustable to accommodate chassis of different dimensions.

2. In combination with a base member disposed upon a slidable assembly, a universal chassis mount comprising a base plate divided into a plurality of individual segments and adapted to have a chassis rest thereon, an adjustable member disposed between said base member and each of said individual segments of said base plate for varying the distance therebetween, said adjustable member including means for locking said adjustable member in different positions at one end to said base member to hold said segments in predetermined desired positions, and a securing member removably and adjustably attached to said base member to hold a chassis in fixed physical relationship with respect to said base plate, said securing member being adjustable to accommodate chassis of different dimensions.

3. In combination with a base member disposed upon a slidable assembly, a universal chassis mount comprising a base plate divided into a plurality of individual segments and adapted to have a chassis rest thereon, an adjustable member disposed between said base member and each of said individual segments of said base plate for varying the distance therebetween, said adjustable member including a member threadedly engaging said base member and a universal joint including a ball and socket disposed to engage each of said segments of said base plate, and a securing member removably and adjustably attached to said base member to hold a chassis in fixed physical relationship with respect to said base plate.

4. In combination with a base member disposed upon a slidable assembly, a universal chassis mount comprising a base plate divided into a plurality of individual segments and adapted to have a chassis rest thereon, an adjustable member disposed between said base member and each of said individual segments of said base plate for varying the distance therebetween, and a securing member removably and adjustably attached to said base member to hold a chassis in fixed physical relationship with respect to said base plate, said securing member including at least one pair of adjustable links having a connecting rod therebetween, said adjustable links being adjustable to a position to permit said connecting rod to firmly engage chassis of different dimensions thereby securing said chassis to said base plate.

5. In combination with a base member disposed upon a slidable assembly, a universal chassis mount comprising a base plate divided into a plurality of individual segments and adapted to have a chassis rest thereon, an adjustable member disposed between said base member and each of said individual segments of said base plate for varying the distance therebetween, said adjustable member including a threaded member threadedly engaging said base member and a universal joint including a ball and socket disposed to engage each of said segments of said base plate, and a securing member removably and adjustably attached to said base member to hold a chassis in fixed physical relationship with respect to said base plate, said securing member including at least one pair of adjustable links having a connecting rod therebetween, said adjustable links being adjustable to a position to permit said connecting rod to firmly engage chassis of different dimensions thereby securing said chassis to said base plate.

6. In combination with a base member disposed upon a slidable assembly, a universal chassis mount comprising a base plate divided into a plurality of individual segments and adapted to have a chassis rest thereon, adjustable connecting members between said individual segments to provide means for varying the distance therebetween, an adjustable member disposed between said base member and each of said individual segments of said base plate for varying the distance therebetween, said adjustable member including a threaded member threadedly engaging said base member and a universal joint including a ball and socket disposed to engage each of said segments of said base plate, a securing member removably and adjustably attached to said base member to hold a chassis in fixed physical relationship with respect to said base plate, said securing member including at least one pair of adjustable links, a connecting rod connected to universal joints between said adjustable links, said adjustable links being adjustable to permit said connecting rod to firmly engage chassis of different dimensions thereby securing said chassis to said base plate, and said universal joints permitting said connecting rod to be adjusted to different angles with respect to each of said adjustable links.

7. In combination with a base member disposed upon a slidable assembly adapted to receive chassis of various dimensions and shapes, a universal chassis mount comprising a base plate divided into four substantially rectangular individual segments and adapted to have said chassis rest thereon, connecting plate members between said individual segments to provide means for holding said segments in fixed relative positions, said connecting plate members having slot openings associated therewith to permit adjustment of the spacing between each of said segments, means for holding said individual segments in fixed relationship to each other at a desired spaced relationship between said segments, an adjustable member disposed between said base member and each of said individual segments of said base plate for varying the distance therebetween, said adjustable member including a threaded member threadedly engaging said base member and locked in place therewith with a lock nut, said adjustable member further including a universal joint having a ball and socket arrangement disposed to provide a resting member for each of said segments of said base plate for different heights and angles, a pair of securing members removably and adjustably attached to said base member to hold a chassis in fixed physical relationship with respect to said base plate, said securing member including at least one pair of adjustable links having a connecting rod connected to universal joints between said adjustable links, said adjustable rods being adjustable to permit said connecting rod to firmly engage chassis of different dimensions thereby securing said chassis to said base plate, and said universal joints associated with said connecting rod to permit said connecting rod to be adjusted to different angles with respect to each of said adjustable links.

8. A chassis mount comprising a base member, a base plate having a plurality of segments, a plurality of adjustable members disposed between said base member and said segments of said base plate, and connecting plates adjustably joining said segments of said base plate.

References Cited in the file of this patent
FOREIGN PATENTS
546,747        Canada _____ Oct. 1, 1957